(12) United States Patent
Lee et al.

(10) Patent No.: US 6,292,248 B1
(45) Date of Patent: Sep. 18, 2001

(54) COG TYPE LIQUID CRYSTAL PANEL AND FABRICATION METHOD THEREOF HAVING FIRST AND SECOND CONDUCTIVE BUMPS IN DIFFERENT PLANES

(75) Inventors: Joo Hong Lee, Kyungsangbuk-Do; Jin Kyu Kim, Suwon-Si, both of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/112,890

(22) Filed: Jul. 9, 1998

(30) Foreign Application Priority Data

Aug. 9, 1997 (KR) .............................................. P97-38093
Aug. 9, 1997 (KR) .............................................. P97-38094

(51) Int. Cl.[7] ................................................ G02F 1/1345
(52) U.S. Cl. ......................... 349/149; 349/150; 349/151
(58) Field of Search .................................... 349/149, 150, 349/151, 152

(56) References Cited

U.S. PATENT DOCUMENTS

| 5,436,744 | | 7/1995 | Arledge et al. . | |
|---|---|---|---|---|
| 5,608,559 | * | 3/1997 | Inada et al. ........................... | 349/149 |
| 5,726,726 | | 3/1998 | Nakanishi . | |
| 5,737,053 | * | 4/1998 | Yomogihara et al. ................ | 349/149 |
| 5,822,030 | * | 10/1998 | Uchiyama ............................ | 349/149 |
| 5,893,623 | * | 4/1999 | Muramatsu .......................... | 349/152 |

FOREIGN PATENT DOCUMENTS 9152621    6/1997    (JP) .

* cited by examiner

*Primary Examiner*—Walter J. Malinowski

(57) ABSTRACT

A liquid crystal panel incorporating a chips on glass (COG) system has a significantly increased field area and greatly reduced glass substrate size because driving integrated circuit chips for applying signals to electrode pads connected to pixels and flexible printed circuit films for applying electrical signals to the driving integrated circuit chips are overlappedly mounted on a lower glass substrate.

10 Claims, 5 Drawing Sheets

COG TYPE LIQUID CRYSTAL PANEL AND FABRICATION METHOD THEREOF HAVING FIRST AND SECOND CONDUCTIVE BUMPS IN DIFFERENT PLANES

BACKGROUND OF THE INVENTION

1. Field of the Invention

The present invention relates to a liquid crystal display apparatus, and more particularly, to a liquid crystal panel incorporating a "chips-on-glass" (COG) system wherein integrated circuit (IC) chips are directly mounted on a glass substrate. Also, the present invention is directed to a method of manufacturing a COG type liquid crystal panel.

2. Description of the Related Art

Since a liquid crystal display apparatus display has advantages including a light weight, a small thickness, a low power consumption and so on, its applications have been steadily enlarged. The liquid crystal display apparatus includes a picture display having picture elements or pixels of liquid crystal arranged in a matrix pattern, and driving IC chips, hereinafter referred to as D-IC chips, for driving the liquid crystal display. Recently, a liquid crystal display apparatus has been manufactured using the COG system in which D-IC chips are directly mounted on the edge of a glass substrate. Also, the COG type liquid crystal panel makes use of a flexible printed circuit (FPC) film for applying signals to the D-IC chips.

In such a COG type liquid crystal panel, since the D-IC chips and the FPC film are mounted at different positions on the glass substrate, the effective field area is small and the size of liquid crystal panel is large. Further, the FPC film includes a wiring for commonly applying electric signals to all the D-IC chips. This results in an increase in the wiring amount of the FPC film, as well as an increase in the manufacturing cost of FPC film and an increase in the manufacturing cost of liquid crystal panel.

For example, as shown in FIG. 1A and FIG. 1B, the COG type liquid crystal panel includes D-IC chips 6 mounted on the edge of a lower glass substrate 4 in such a manner to be positioned between an upper glass substrate 2 and a FPC film 8. A picture display having liquid crystal cells and thin film transistors (TFTs) arranged in a matrix pattern is formed between the lower glass substrate 4 and the upper glass substrate 2. The edge of the lower glass substrate 4 mounted with the D-IC chips 6 and the FPC film 8 is usually referred to as a "pad area" because electrode pads for supplying signals to drive the TFTs are located at the edge of the lower glass substrate 4. In this pad area, output wiring electrodes (not shown) are provided for connecting the D-IC chips 6 with the picture display and input wiring electrodes (not shown) are provided for connecting the D-IC chips 6 and the FPC film. The D-IC chips 6 are provided to drive the TFTs and are adhered to the pad area via an anisotropic conductive film (ACF) 10 and bumps 10A in such a manner to be electrically connected to the input and output wiring electrodes. The FPC film 8 is mounted with a wiring for transferring electrical signals, e.g., video data signals, timing control signals and voltage signals, from a control circuit (not shown) to the D-IC chips 6. Such a FPC film 8 also is adhered to the pad area via the ACF 10 and the bumps 10A in such a manner to be electrically connected to the input wiring electrodes.

As described above, in the conventional COG type liquid crystal panel, the D-IC chips and the FPC film are mounted in parallel at the pad area, causing the pad area to be enlarged. As a result of this mounting arrangement, the field area becomes small and the size of glass substrate becomes large. Further, in the conventional COG type liquid crystal panel, the FPC film is adhered to the pad area on the lower glass substrate such that it is located at positions corresponding to locations of all of the D-IC chips. This results in an increase in a wiring amount located at the FPC film and an increase in the manufacturing cost of the FPC film and a increase in the manufacturing cost of the liquid crystal panel.

SUMMARY OF THE INVENTION

In order to overcome the problems described above, preferred embodiments of the present invention provide a COG type liquid crystal panel that is adapted to enlarge a field area and to reduce the size of a glass substrate, and a method for such a COG type liquid crystal panel.

In addition, the preferred embodiments of the present invention provide a COG type liquid crystal panel that is adapted to simplify a FPC film, and a method for making such a COG type liquid crystal panel with a simplified FPC.

According to one aspect of preferred embodiments of the present invention, a liquid crystal panel incorporating a chips-on-glass (COG) system and having a plurality of pixels arranged between an upper glass substrate and a lower glass substrate, and electrode pads connected to the pixels on the lower glass substrate, including driving integrated circuit chips mounted on the lower glass substrate to apply signals to the electrode pads, and a flexible printed circuit film mounted on the lower glass substrate to overlap the driving integrated circuit chips for applying electrical signals to the driving integrated circuit chips.

According to another preferred embodiment of the present invention, a liquid crystal panel incorporating a COG system and having a plurality of pixels arranged between an upper glass substrate and a lower glass substrate includes first electrode pads connected to the pixels on the lower glass substrate and second electrode pads located on the lower glass substrate and substantially parallel to the first electrode pads, including a signal wiring disposed on the lower glass substrate to intersect the second electrode pads and to be coupled to a portion of the second electrode pads, a plurality of driving integrated circuit chips mounted on the lower glass substrate so as to be electrically coupled to the first and second electrode pads, and a flexible printed circuit film mounted on the lower glass substrate so as to be electrically coupled to the signal wiring and the remaining second electrode pads, for applying electrical signals to the driving integrated circuit chips.

According to still another aspect of preferred embodiments the present invention, there is provided with a liquid crystal panel of COG system having a plurality of pixels arranged between an upper glass substrate and a lower glass substrate, first electrode pads connected to the pixels on the lower glass substrate, and second electrode pads on the lower glass substrate and substantially parallel to the first electrode pads, including a signal wiring located on the lower glass substrate to intersect the second electrode pads and to be coupled to a part of the second electrode pads, a plurality of driving integrated circuit chips mounted on the lower glass substrate to be electrically coupled to the first and second electrode pads, a first flexible printed circuit film mounted on the lower glass substrate to be electrically coupled to the signal wiring for applying first electrical signals to the driving integrated circuit chips, and a second flexible printed circuit film mounted at the upper portion of the driving integrated circuit chips to apply second electrical signals to the driving integrated circuit chips.

According to still another preferred embodiment of the present invention, a method of manufacturing a liquid crystal panel incorporating a COG system and including the steps of preparing a glass substrate having a plurality of pixels and electrode pads formed thereon, the electrode pads being connected to the pixels, adhering a first anisotropic conductive film to the upper portions of the electrode pads, arranging first conductive bumps on the first anisotropic conductive film to correspond to positions of the electrode pads, disposing a flexible printed circuit film at the upper portions of the first conductive bumps, pressing the flexible printed circuit film, adhering a second anisotropic conductive film to the upper portion of the flexible printed circuit film, arranging second conductive bumps along both edges of the second anisotropic conductive film, arranging driving integrated circuit chips at the upper portions of the second conductive bumps, and pressing the driving integrated circuit chips.

According to still another preferred embodiment of the present invention, a method of manufacturing a liquid crystal panel incorporating a COG system includes the steps of preparing a glass substrate having a plurality of pixels and electrode pads formed thereon, the electrode pads being connected to the pixels, adhering a first anisotropic conductive film to the upper portions of the electrode pads, arranging first conductive bumps on the first anisotropic conductive film to correspond to positions of the electrode pads, arranging driving integrated circuit chips at the upper portions of the first conductive bumps, pressing the driving integrated circuit chips, adhering a second anisotropic conductive film to the upper portions of the driving integrated circuit chips, arranging second conductive bumps along both edges of the second anisotropic conductive film, disposing a flexible printed circuit film at the upper portions of the second conductive bumps and pressing the flexible printed circuit film.

According to still another aspect of preferred embodiments of the present invention, a method of manufacturing a liquid crystal panel incorporating a COG system, includes the steps of preparing a glass substrate having a plurality of pixels having first electrode pads and second electrode pads formed thereon, the first electrode pads being connected to the pixels and the second electrode pads being arranged to be substantially parallel to the first electrode pads, forming a signal wiring on the glass substrate to intersect the second electrode pads and to be connected to a part of the second electrode pads, adhering an anisotropic conductive film to the upper portions of the first and second electrode pads and the signal wiring, arranging conductive bumps on the anisotropic conductive film to correspond to locations of the first and second electrode pads and the signal wiring, arranging driving integrated circuit chips and a flexible printed circuit film at the upper portions of the conductive bumps, and pressing the driving integrated circuit chips and the flexible printed circuit film.

According to still another aspect of preferred embodiments of the present invention, a method of manufacturing a liquid crystal panel incorporating a COG system, includes the steps of preparing a glass substrate having a plurality of pixels, first electrode pads and second electrode pads formed thereon, the first electrode pads being connected to the pixels and the second electrode pads being arranged in parallel to the first electrode pads, forming a signal wiring on the glass substrate to intersect the second electrode pads and to be connected to a part of the second electrode pads, adhering a first anisotropic conductive film to the upper portions of the first and second electrode pads and the signal wiring, arranging first conductive bumps at the upper portion of the first anisotropic conductive film to correspond with the first and second electrode pads and the signal wiring, arranging driving integrated circuit chips and a first flexible printed circuit film at the upper portions of the first conductive bumps, pressing the driving integrated circuit chips and the first flexible printed circuit film, adhering a second anisotropic conductive film to the upper portions of the driving integrated chips, arranging second conductive bumps at the upper portion of the second anisotropic conductive film, positioning a second flexible printed circuit film at the upper portions of the second conductive bumps, and pressing the second flexible printed circuit film.

Other features and advantages of the present invention will become apparent from the following description of preferred embodiments of the invention which refers to the accompanying drawings, wherein like reference numerals indicate like elements to avoid duplicative description.

DETAILED DESCRIPTION OF PREFERRED EMBODIMENTS

Figure 1A:
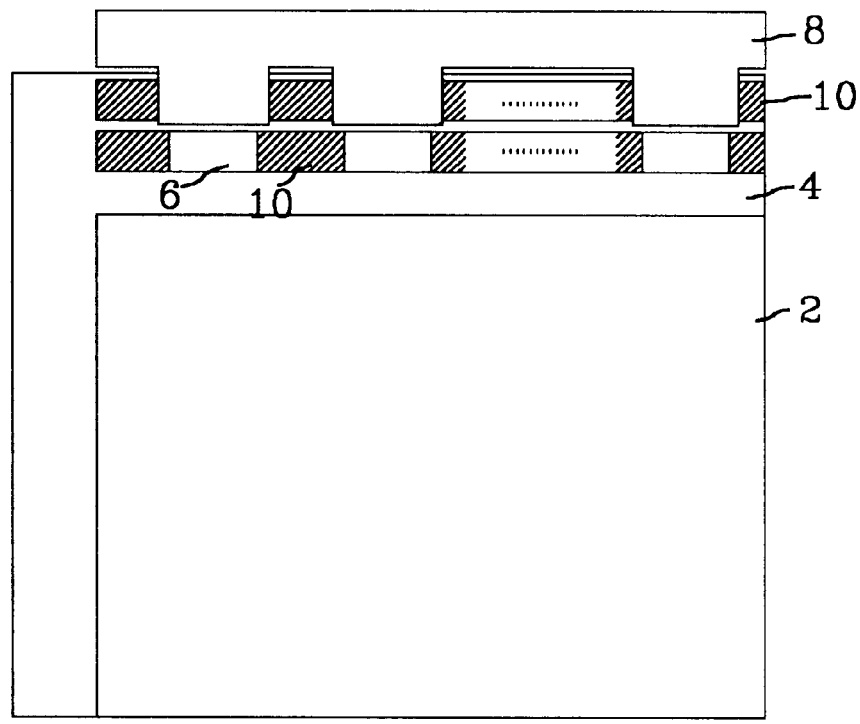
FIG. 1A is a schematic plan view of a conventional COG type liquid crystal panel.
Figure 1B:
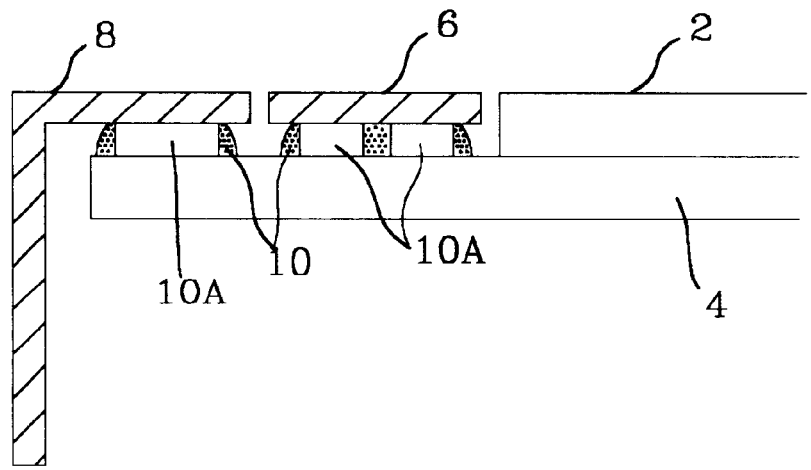
FIG. 1B is a schematic section view of the conventional COG type liquid crystal panel.
Figure 2A:
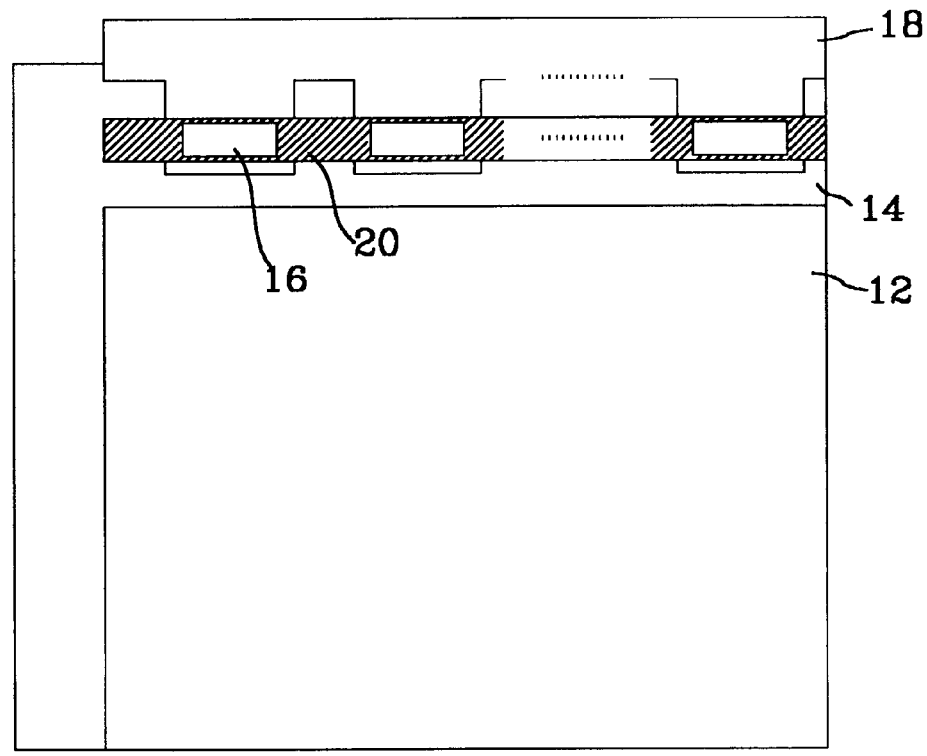
FIG. 2A is a schematic plan view of a COG type liquid crystal panel according to a first preferred embodiment of the present invention.
Figure 2B:
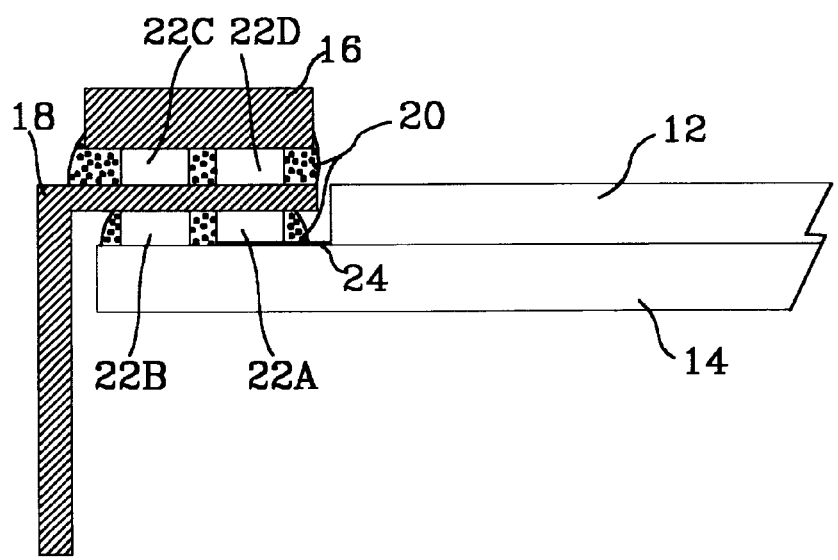
FIG. 2B is a schematic section view of a COG type liquid crystal panel according to a first preferred embodiment of the present invention.

Referring to FIG. 2A and FIG. 2B, there is shown a COG type liquid crystal panel according to a first preferred embodiment of the present invention. The COG type liquid crystal panel includes an upper glass substrate 12 provided arranged to face an upper portion of a lower glass substrate 14, a FPC film 18 mounted at a pad area of the lower glass substrate 12 which is located at an edge portion of the lower glass substrate 12, and D-IC chips 16 mounted at the upper portion of the FPC film 18. Picture displays having liquid crystal cells and TFTs arranged in a matrix pattern are located between the upper glass substrate 12 and the lower glass substrate 14. The FPC film 18 is adhered to the pad area on the lower glass substrate 14 via an anisotropic conductive film ACF 20 and is electrically coupled with electrode pads 24 connected to the liquid crystal display via connecting bumps 22A. Dummy bumps 22B are also provided for support and stability of the FPC 18 and D-IC chips 16. The D-IC chips 16 are adhered to the upper portion of the FPC film 18 via the ACF 20. Also, the D-IC chips 16 are electrically coupled with the FPC film 18 via input bumps 22C and output bumps 22D. The input bumps 22C deliver signals from the FPC film 18 to the D-IC chips 16 and the output bumps 22D deliver signals from the D-IC chips 16 to both the FPC film 18 and the interfacing bumps 22A. In other words, the FPC film 18 positioned between the lower glass substrate 14 and the D-IC chips 16 transfers electrical signals from a control circuit (not shown) to the D-IC chips 16. At the same time, the FPC film 18 transfers TFT driving signals from the D-IC chips 16 to the electrode pads 24 connected to the picture display. As mentioned above, the D-IC chips 16 and the FPC film 18 are overlappedly mounted at the pad area on the lower glass substrate 4, thereby reducing the size of pad area. As a result of the above-described unique arrangement, the field area of the COG type liquid crystal panel is significantly increased and the size of the COG type liquid crystal panel is significantly decreased.

A method of manufacturing the above-mentioned COG type liquid crystal panel which is overlappedly mounted with the FPC film 18 and the D-IC chips 16 will be described in detail below. First, the ACF 20 is attached to the pad area of the lower glass substrate 14 to which the upper glass substrate 12 is adhered. The interfacing bumps 22A and dummy bumps 22B are preferably arranged substantially in parallel at both edges of the ACF 20, and the FPC film 18 is mounted on the upper portions of the interfacing bumps 22A and the dummy bumps 22B. The FPC film 18 disposed on the upper portions of the connecting bumps 22A and the dummy bumps 22B is pressed toward the lower glass substrate 14 via application of downward pressure, and is electrically coupled with the electrode pads 24. Next, after the ACF 20 is attached to the upper portion of the FPC film 18, the input bumps 22C and the output bumps 22D are preferably arranged substantially in parallel at both edges of the ACF 20. The D-IC chips 16 are arranged at the upper portions of the input and output bumps 22C and 22D. The D-IC chips 16 disposed on the upper portions of the input and output bumps 22C and 22D are pressed toward the FPC film 18 via application of downward pressure and are electrically coupled with the FPC film 18.

Figure 3A:
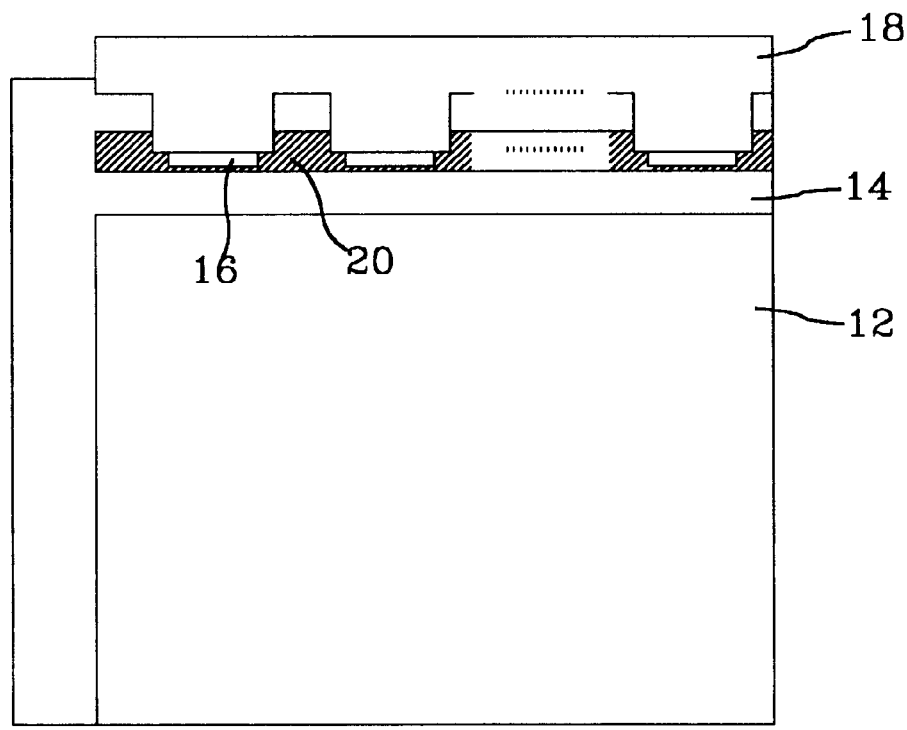
FIG. 3A is a schematic plan view of a COG type liquid crystal panel according to a second preferred embodiment of the present invention.
Figure 3B:
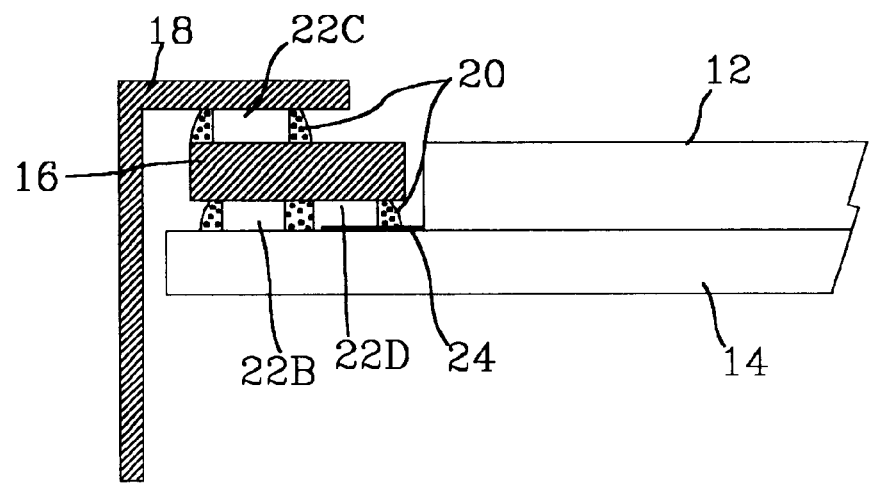
FIG. 3B is a schematic section view of a COG type liquid crystal panel according to a second preferred embodiment of the present invention.

Referring to FIG. 3A and FIG. 3B, there is shown a COG type liquid crystal panel according to a second preferred embodiment of the present invention. The COG type liquid crystal panel includes an upper glass substrate 12 adhered to the upper portion of the lower glass substrate 14, D-IC chips 16 mounted at a pad area on the lower glass substrate 12, and a FPC film 18 mounted at the upper portion of the D-IC chips 16. Picture displays having liquid crystal cells and TFTs arranged in a matrix pattern are disposed between the upper glass substrate 12 and the lower glass substrate 14. The D-IC chips 16 are adhered to the pad area on the lower glass substrate 14 via an ACF 20 and are electrically coupled with electrode pads 24 connected to the liquid crystal display via output bumps 22D. Also, the D-IC chips 16 receive electrical signals, transmitted via input bumps 22C positioned at the upper portion thereof, from the FPC film 18. Dummy bumps 22B positioned between the edge of the lower glass substrate 14 and the output bumps 22D support the D-IC chips 16 in a reliable and stable manner. The FPC film 18 is adhered to the upper portions of the D-IC chips 16 via the ACF 20 and is electrically coupled with the D-IC chips via input bumps 22c. The D-IC chips 16 output TFT control signals for driving the TFTs, via output bumps 22D, to the electrode pads 24 in response to electrical signals inputted, via the input bumps 22C, from the FPC film 18. The FPC film 18 transfers electrical signals from a control circuit (not shown) to the D-IC chips 16. As mentioned above, the D-IC chips 16 and the FPC film 18 are overlappedly mounted at the pad area on the lower glass substrate 14, thereby reducing the size of pad area. As a result of this unique arrangement, the field area of the COG type liquid crystal panel is significantly increased and the size of the COG type liquid crystal panel is greatly reduced.

A method of manufacturing the above-mentioned COG type liquid crystal panel which is overlappedly mounted with the FPC film 18 and the D-IC chips 16 will be described in detail below. First, the AFC 20 is attached to the pad area of the lower glass substrate 14 to which the upper glass substrate 12 is adhered. The output bumps 22D and the dummy bumps 22B are preferably arranged substantially in parallel at both edges of the ACF 20, and the D-IC chips 16 are mounted on the upper portions of the output bumps 22D and the dummy bumps 22B. The D-IC chips 16 disposed on the upper portions of the output bumps 22D and the dummy bumps 22B are pressed toward the lower glass substrate 14 via application of downward pressure and are electrically coupled with the electrode pads 24. Next, after the ACF 20 is attached to the upper portion of the FPC film 18 again, the input bumps 22C are arranged preferably along a line at the outer edges of the ACF 20. The FPC film 18 is mounted on the upper portions of the input bumps 22C. The FPC film 18 disposed on the upper portions of the input bumps 22C is pressed toward the D-IC chips 16 via application of downward pressure and is electrically coupled with the D-IC chips 16.

Figure 4A:
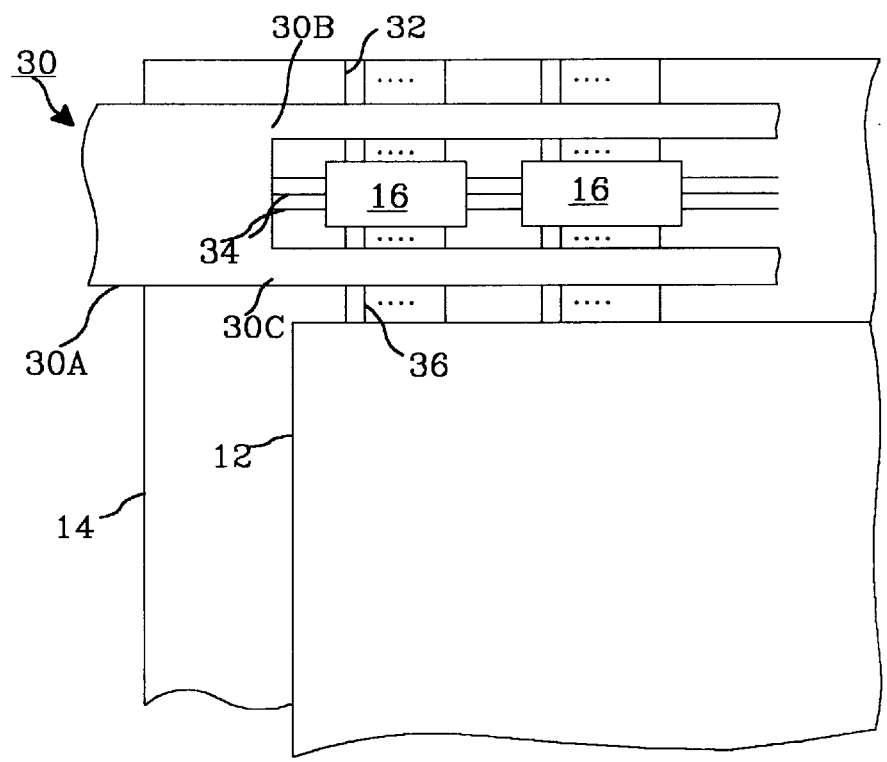
FIG. 4A is a schematic plan view of a COG type liquid crystal panel according to a third preferred embodiment of the present invention.
Figure 4B:
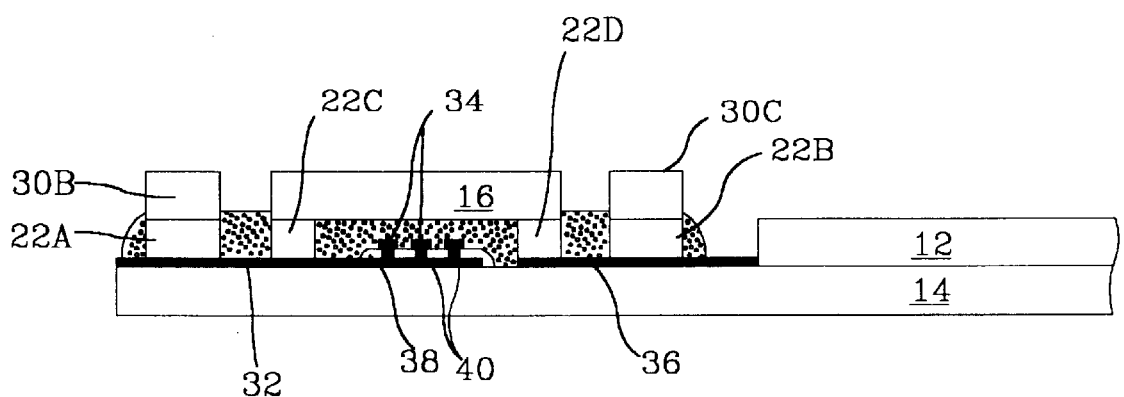
FIG. 4B is a schematic section view of a COG type liquid crystal panel according to a third preferred embodiment of the present invention.

Referring to FIG. 4A and FIG. 4B, there is shown a COG type liquid crystal panel according to a third preferred embodiment of the present invention. The COG type liquid crystal panel includes an upper glass substrate 12 adhered to the upper portion of a lower glass substrate 14, D-IC chips 16 mounted at a pad area on the lower glass substrate 12, and a FPC film 30 mounted at the pad area of the lower glass substrate 14 so as to surround the peripheries of the D-ICs 16. Picture displays having liquid crystal cells and TFTs arranged in a matrix pattern are located between the upper glass substrate 12 and the lower glass substrate 14. Input electrode pads 32, signal wiring 34 and output electrode pads 36 are provided at the pad area on the lower glass substrate 14. The input electrode pads 32 extend from the edge of the lower glass substrate 14 to the end portions of the output electrode pads 36. The output electrode pads 36 are coupled with the liquid crystal display. The signal wiring 34 is located at upper portions of the input electrode pads 32 positioned at sides adjacent to the output electrode pads 36. In other words, the signal wiring 34 intersects the input electrode pads 32 at a position where the D-IC chips 16 are to be mounted. An insulating layer 38 is located between the input electrode pads 32 and the signal wiring 34. The input electrode pads 32 are electrically coupled to the signal wiring 34 via contacts passing through the insulating layer 38. The D-IC chips 16 are adhered to the pad area on the lower glass substrate 14 via an ACF 20 such that the D-IC chips 16 are positioned at the upper portions of the signal wiring 34. Also, the D-IC chips 16 are electrically coupled with the input electrode pads 32 and the output electrode pads 36 via input bumps 22C and output bumps 22D. The FPC film 30 has a base film 30A adhered to one end of the pad area on the lower glass substrate 14, and a branch film 30B and a dummy film 30C, each of which preferably extends substantially parallel to each side of the D-IC chips 16 from one end of the base film 30A. The center of one end of the base film 30A is adhered to the lower glass substrate 14 via the ACF 20, and is electrically coupled to the signal wiring 34 via conductive bumps (not shown). The branch film 30B and the dummy film 30C also are adhered to the lower glass substrate 14 via the ACF 20. The branch film 30B is electrically coupled to the input electrode pads 32 by connecting bumps 22A and the dummy film 30C is supported by the dummy bumps 22B so as to be electrically disconnected from the output electrode pads 36. In other words, the dummy film 30C is used as an auxiliary supporting member allowing the FPC film 30 to be adhered onto the lower glass substrate 14 in a stable and reliable manner. The FPC film 30 mounted at the pad area on the lower glass substrate 14 in this manner transfers a portion of electrical signals from a control circuit (not shown) via the signal wiring 34, to the input electrode pads 32. At the same time, the FPC film 30 transfers the remaining electrical signals to the input electrode pads 32 directly. In this case, the electrical signals passing through the signal wiring 34 are not sensitive to a resistance like driving voltage signals. In contrast, the electrical signals delivered from the branch film 30B to the input electrode pads 32 directly are sensitive to a resistance like video data and timing control signals. As described above, the portion of electrical signals directly delivered from the FPC film 30 is relayed via the signal wiring 34 located on the lower glass substrate 16, thereby simplifying a wiring structure of the FPC film 30. Accordingly, it is possible to reduce the manufacturing cost of FPC film and the manufacturing cost of COG type liquid crystal panel. Further, the signal wiring 34 is arranged to overlap with the D-IC chips 16, thereby reducing the pad margin. As a result, the COG liquid crystal panel constructed as described above has a significantly reduced size and increased field area.

A method of manufacturing such a COG type liquid crystal panel will be described in detail below. First, there is prepared the lower glass substrate 14 having the upper glass substrate 12 adhered, and having the input electrode pads 32, the signal wiring 34 and the output electrode pads 36 formed at the pad area thereof. The input electrode pads 32 and the output electrode pads 36 is formed by coating a conductive material layer of the same conductive material as the source and drain of the TFT thereon and then patterning the conductive material layer. The signal wiring is formed by defining the insulating layer 38 at the upper portions of the input electrode pads 32 and the output electrode pads 34, forming contact holes for exposing the input electrode pads 32 at the insulating layer 38, depositing a conductive material layer of the same conductive material as the source and drain of the TFT to bury the contact holes, and patterning the conductive material layer and the insulating layer, sequentially. Next, after the ACF 20 is attached to the pad area on the lower glass substrate 16, conductive bumps(not shown) together with the connecting bumps 22A, the input bumps 22C, the output bumps 22D and the dummy bumps 22B, are preferably arranged substantially in parallel at the upper portion of the ACF 20. The D-IC chips 16 are disposed on the upper portions of the input bumps 22C and the output bumps 22D. The branch film 30B is mounted onto the upper portion of the connecting bumps 22A. The dummy film 30C is mounted on the dummy bumps 22B. The base film 30A is mounted on the upper portions of the conductive bumps (not shown). The D-IC chips 16, the base film 30A, the branch film 30B, the branch film 30B and the dummy film 30C are adhered to the lower glass substrate 16 via application of a downward force. At this time, the branch film 30B is connected to the input electrode pads 32 via the interfacing bumps 22A, and the base film 30A is electrically coupled to the signal wiring 34 via the conductive bumps. Also, the D-IC chips 16 are electrically coupled to both the input electrode pads 32 and the output electrode pads via the input bumps 22C and the output bumps 22D.

Figure 5A:
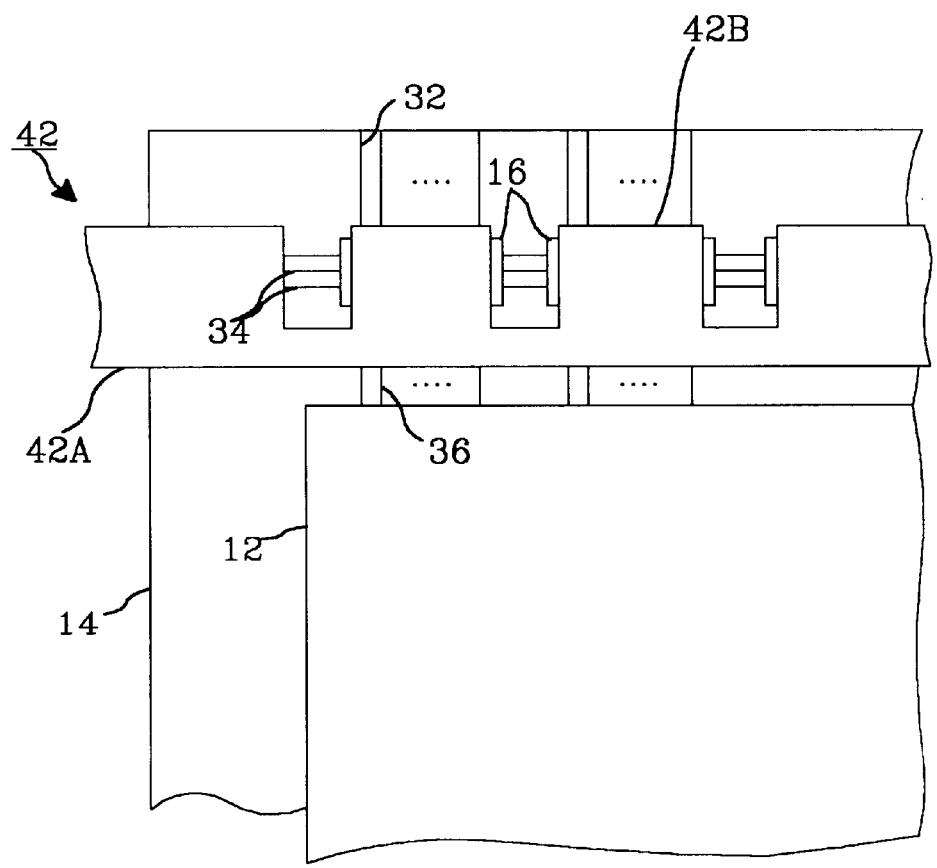
FIG. 5A is a schematic plan view of a COG type liquid crystal panel according to a fourth preferred embodiment of the present invention.
Figure 5B:
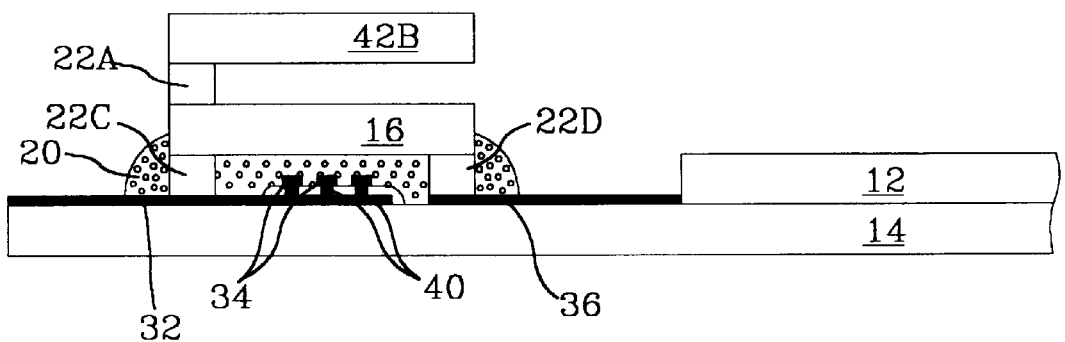
FIG. 5B is a schematic section view of a COG type liquid crystal panel according to a fourth preferred embodiment of the present invention.

Referring to FIG. 5A and FIG. 5B, there is shown a COG type liquid crystal panel according to a third preferred embodiment of the present invention. The COG type liquid crystal panel includes an upper glass substrate 12 adhered to the upper portion of a lower glass substrate 14, D-IC chips 16 mounted at a pad area on the lower glass substrate 12, and a FPC film 42 for applying electrical signals to the D-IC chips 16. Picture displays having liquid crystal cells and TFTs arranged in a matrix pattern are located between the upper glass substrate 12 and the lower glass substrate 14. Input electrode pads 32, signal wiring 34 and output electrode pads 36 are defined at the pad area on the lower glass substrate 14. The input electrode pads 32 extend from the edge of the lower glass substrate 14 to the vicinity of the end of the output electrode pads 36. The output electrode pads 36 are coupled to the liquid crystal display. The signal wiring 34 is disposed at the upper portions of the input electrode pads 32 at a side adjacent to the output electrode pads 36. In other words, the signal wiring 34 intersects the input electrode pads 32 at a position to be mounted with the D-IC chips 16. An insulating layer 38 is located between the input electrode pads 32 and the signal wiring 34. The input electrode pads 32 are electrically coupled to the signal wiring 34 via contacts 40 passing through the insulating layer 38. The D-IC chips 16 are adhered to the pad area on the lower glass substrate 14 via an ACF 20 such that the D-IC chips 16 are positioned at the upper portions of the signal wiring 34. Also, the D-IC chips 16 are electrically coupled with the input electrode pads 32 and the output electrode pads 36 via the input bumps 22C and output bumps 22D. The FPC film 42 has a base film 42A adhered to one end of the pad area on the lower glass substrate 14, and a tab film 42B extending from one side corner of the base film 42A to be mounted at the upper portions of the D-IC chips 16. One end of the base film 42A is adhered to the lower glass substrate 14 via the ACF 20. At the same time, one end of the base film 42A is electrically coupled to the signal wiring via conductive bumps (not shown). On the other hand, the tab film 42B is adhered to the upper portions of the D-ICs 16 via the ACF 20 and, at the same time, is electrically coupled to the D-IC chips 16 via interfacing bumps 22A. The FPC film 42 mounted at the pad area on the lower glass substrate 14 in this manner transfers a portion of electrical signals from a control circuit(not shown), via the signal wiring 34, to the input electrode pads 32. At the same time, the FPC film 30 transfers the remaining portions of the electrical signals to the input electrode pads 32 directly. In this case, the electrical signals passing through the signal wiring 34 are not sensitive to a resistance like driving voltage signals. In contrast, the electrical signals delivered from the tab film 42B to the input electrode pads 32 directly are sensitive to a resistance like video data and timing control signals. As described above, the portion of electrical signals directly delivered from the FPC film 42 is relayed via the signal wiring 34 disposed on the lower glass substrate 14, thereby simplifying a wiring structure of the FPC film 42. Accordingly, it is possible to reduce the manufacturing cost of FPC film and the manufacturing cost of COG type liquid crystal panel. Further, both the signal wiring 34 and the FPC film 42 are arranged to overlap with the D-IC chips 16, thereby reducing the size or area of the pad margin. As a result, the COG liquid crystal panel has a significantly reduced size while also providing a greatly increased field area.

A method of manufacturing such a COG type liquid crystal panel will be described in detail below. First, a lower glass substrate 14 is adhered to an upper glass substrate 12 having the input electrode pads 32, the signal wiring 34 and the output electrode pads 36 disposed at the pad area thereof. The input electrode pads 32 and the output electrode pads 36 are preferably formed by coating a conductive material layer which is made of the same material as used for the conductive material of the source and drain of the TFT disposed thereon, and then patterning the conductive material layer. The signal wiring 34 is formed by defining the insulating layer 38 at the upper portions of the input electrode pads 32 and the output electrode pads 34, forming contact holes for exposing the input electrode pads 32 at the insulating layer 38, depositing a conductive material layer of the same conductive material as the source and drain of the TFT to bury the contact holes, and patterning the conductive material layer and the insulating layer, sequentially. Next, after the ACF 20 is attached to the pad area on the lower glass substrate 16, conductive bumps (not shown) together with the input bumps 22C and the output bumps 22D are preferably arranged substantially in parallel at the upper portion of the ACF 20. The D-IC chips 16 are disposed on the upper portions of the input bumps 22C and the output bumps 22D. The base film 42A is mounted on the upper portions of the conductive bumps (not shown). The D-IC chips 16 and the base film 42A are adhered to the lower glass substrate 16 via application of downward pressure. At this time, the base film 42A is electrically coupled to the signal wiring 34 via the conductive bumps, while the D-IC chips 16 are electrically coupled to the input electrode pads 32 and the output electrode pads 36 via the input bumps 22C and the output bumps 22D. Subsequently, after the ACF 20 is attached to the upper portion of the D-IC chips 16 again, the interfacing bumps 22A are preferably arranged along a line at the outer edge of the ACF 20. The tab film 42B defining a part of the FPC film 42 is mounted on the upper portions of the interfacing bumps 22A. The tab film 42A disposed on the upper portions of the interfacing bumps 22A is pressed toward the D-IC chips 16 via application of downward pressure and, at the same time, is electrically coupled, via the interfacing bumps 22A, to the D-IC chips 16.

As described above, in the COG type liquid crystal panel according to preferred embodiments of the present invention, the D-IC chips and the FPC film are overlappedly mounted at the pad area, thereby reducing the size of the pad area. Accordingly, the COG type liquid crystal panel according to preferred embodiments of the present invention has a significantly enlarged field area and a significantly reduced size of the glass substrate. Further, in the COG type liquid crystal panel according to preferred embodiments of the present invention, a portion of electrical signals to be transferred from the FPC film to the D-IC chips is relayed via the signal wiring located on the glass substrate, thereby reducing a wiring amount of the FPC film. As a result, the COG type liquid crystal panel according to preferred embodiments of the present invention greatly simplifies a wiring structure of the FPC film and greatly reduces a cost of manufacturing of the FPC film and the liquid crystal panel.

Although the present invention has been explained with reference to preferred embodiments shown in the drawings described above, it should be understood to the ordinary skilled person in the art that the invention is not limited to the preferred embodiments described herein, but rather that various changes or modifications thereof are possible without departing from the spirit of the invention. Accordingly, the scope of the invention shall be determined only by the appended claims and their equivalents.

What is claimed is:

1. A method of manufacturing a liquid crystal panel incorporating a chips-on-glass system, comprising the steps of:

preparing a glass substrate having a plurality of pixels and electrode pads formed thereon, said electrode pads being connected to the pixels;

adhering a first anisotropic conductive film to the upper portions of the electrode pads;

arranging first conductive bumps on the first anisotropic conductive film at positions corresponding to locations of the electrode pads;

disposing a flexible printed circuit film at the upper portions of the first conductive bumps;

pressing the flexible printed circuit film toward the glass substrate;

adhering a second anisotropic conductive film to the upper portion of the flexible printed circuit film;

arranging second conductive bumps along both edges of the second anisotropic conductive film;

arranging driving integrated circuit chips at the upper portions of the second conductive bumps to overlap the flexible printed circuit film; and pressing the driving integrated circuit chips toward the substrate.

2. The method as claimed in claim 1, further comprising the step of arranging dummy bumps between the glass substrate and the flexible printed circuit film so as to be substantially parallel to the first conductive bumps.

3. A method of manufacturing a liquid crystal panel incorporating a chips-on-glass system, comprising the steps of:

preparing a glass substrate having a plurality of pixels and electrode pads formed thereon, said electrode pads being connected to the pixels;

adhering a first anisotropic conductive film to the upper portions of the electrode pads;

arranging first conductive bumps on the first anisotropic conductive film at locations corresponding to positions of the electrode pads;

arranging driving integrated circuit chips at the upper portions of the first conductive bumps;

pressing the driving integrated circuit chips toward the substrate;

adhering a second anisotropic conductive film to the upper portions of the driving integrated circuit chips;

arranging second conductive bumps along both edges of the second anisotropic conductive film;

disposing a flexible printed circuit film at the upper portions of the second conductive bumps to overlap the driving integrated circuit chips; and pressing the flexible printed circuit film toward the substrate.

4. The method as claimed in claim 3, further comprising the step of arranging dummy bumps between the glass substrate and the driving integrated circuit chips so as to be substantially parallel to the first conductive bumps.

5. A liquid crystal panel incorporating a chips-on-glass system having a plurality of pixels arranged between an upper glass substrate and a lower glass substrate, and electrode pads connected to the pixels on the lower glass substrate, said panel comprising:

driving integrated circuit chips mounted on the lower glass substrate to apply signals to the electrode pads;

a flexible printed circuit film between the driving integrated circuit chips and the lower glass substrate, for applying first electrical signals to the driving integrated circuit chips and the electrode pads and transmitting second electrical signals from the driving integrated circuit chips to the electrode pads;

first conductive bumps, between input terminals of the driving integrated circuit chips and the flexible printed circuit film, for connecting the input terminals of the driving integrated circuit chips to the flexible printed circuit film;

second conductive bumps, between output terminals of the driving integrated circuit chips and the flexible printed circuit film, for connecting the input terminals of the driving integrated circuit chips to the flexible printed circuit film; and third conductive bumps arranged at a lower position relative to the second conductive bumps and between the electrode pads and the flexible printed circuit film.

6. The liquid crystal panel as claimed in claim 5, further comprising dummy bumps arranged at a lower position relative to the first conductive bumps and between the flexible printed circuit film and the lower substrate.

7. The liquid crystal panel as claimed in claim 5, further comprising anisotropic conductive films, wherein said flexible printed circuit film is connected to the electrode pads on the lower glass substrate via one anisotropic conductive film and connected to the driving integrated circuit chips via another anisotropic conductive film.

8. A liquid crystal panel incorporating a chips-on-glass system having a plurality of pixels arranged between an upper glass substrate and a lower glass substrate, and electrode pads connected to the pixels on the lower glass substrate, said panel comprising:

driving integrated circuit chips mounted on the lower glass substrate to apply signals to the electrode pads;

a flexible printed circuit film, mounted at a position upward of the driving integrated circuit chips, for applying electrical signals to the driving integrated circuit chips;

first conductive bumps, between input terminals of the driving integrated circuit chips and the flexible printed circuit film, for connecting the input terminals of the driving integrated circuit chips to the flexible printed circuit film; and second conductive bumps, arranged at a lower position relative to the first conductive bumps and between output terminals of the driving integrated circuit chips and the electrode pads, for connecting the output terminals of the driving integrated circuit chips to the electrode.

9. The liquid crystal panel as claimed in claim 8, further comprising dummy bumps, arranged between the driving integrated circuit chips and the lower substrate, for supporting the driving integrated circuit chips.

10. The liquid crystal panel as claimed in claim 8, further comprising anisotropic conductive films, wherein the driving integrated circuit chips are connected to the electrode pads on the lower glass substrate via one anisotropic conductive film and connected to the flexible printed circuit film via another anisotropic conductive film.

* * * * *